United States Patent [19]

Watanabe et al.

[11] Patent Number: 5,061,460
[45] Date of Patent: Oct. 29, 1991

[54] METHOD FOR MANUFACTURING TITANIUM OXIDE

[75] Inventors: Morio Watanabe, Tokyo; Renpei Sei, Kanagawa, both of Japan

[73] Assignee: Solex Research Corporation of Japan, Tokyo, Japan

[21] Appl. No.: 392,128

[22] Filed: Aug. 10, 1989

[30] Foreign Application Priority Data

Aug. 19, 1988 [JP] Japan .............................. 63-206029
Dec. 8, 1988 [JP] Japan .............................. 63-310887
Dec. 22, 1988 [JP] Japan .............................. 63-324412

[51] Int. Cl.$^5$ ............................................. C01G 23/08
[52] U.S. Cl. ..................................... 423/70; 423/610; 423/DIG. 14
[58] Field of Search ......................... 423/70, 81, 83, 84, 423/85, 86, 139, 140, 143, 146, 147, 150, 492, 493, 608, DIG. 1, DIG. 2, 632, 390, DIG. 14, 610; 75/101 R, 101 BE, 111; 210/688, 754

[56] References Cited

U.S. PATENT DOCUMENTS

| 2,253,595 | 8/1941 | Wood | 423/615 |
| 2,993,757 | 7/1961 | Dasher et al. | 423/DIG. 1 |
| 3,067,010 | 12/1962 | Long et al. | 423/70 |
| 3,104,950 | 9/1963 | Ellis | 423/70 |
| 3,795,727 | 3/1974 | Yamamura et al. | 423/70 |
| 4,048,585 | 11/1977 | MacKay et al. | 423/139 |
| 4,497,655 | 2/1985 | Watanabe et al. | 423/DIG. 1 |
| 4,758,414 | 7/1988 | Gifford et al. | 423/DIG. 2 |

Primary Examiner—Melvyn J. Andrews
Attorney, Agent, or Firm—McAulay Fisher Nissen Goldberg & Kiel

[57] ABSTRACT

A method for manufacturing titanium oxide, comprising bringing a sulfuric acid solution containing predominantly titanium ion together with one or more kinds of metal ions into contact with an organic solvent containing one or more species selected from the group of oxygen-containing organic solvents, alkyl amines, and alkyl aryl amines to extract the titanium ions in a form of a sulfuric acid complex from the sulfuric acid solution, and bringing the organic solvent containing the extracted titanium into contact with water or an aqueous dilute sulfuric acid solution to inversely extract the titanium from the organic solvent to the water or the dilute sulfuric acid solution and to regenerate the organic solvent.

9 Claims, 9 Drawing Sheets

METHOD FOR MANUFACTURING TITANIUM OXIDE

BACKGROUND OF THE INVENTION

1. Field of the Invention

The present invention relates to a method for manufacturing titanium oxide.

2. Description of the Related Art

In manufacture of titanium oxide by a known sulfuric acid process, a titanium-iron-containing substance such as a titanium-iron ore (limenite, or anatase) and titanium slag is brought into contact with concentrated sulfuric acid at an elevated temperature to produce a solid product composed mainly of a sulfated product of titanium containing ferrous sulfate, ferric sulfate, and titanyl sulfate as the main constituents together with magnesium sulfate, chromium sulfate, manganese sulfate, vanadium sulfate, sulfates of other elements, and unreacted substances. The solid is subsequently put into water or sulfuric acid solution for leaching, and then a reducing agent such as iron scrap is added there to convert the ferric sulfate to ferrous sulfate. The solution is cooled to precipitate ferrous sulfate crystal ($FeSO_4 \cdot 7H_2O$), giving a titanium-iron solution containing titanyl sulfate in which iron content is decreased. The titanyl sulfate is hydrolyzed in such a manner that the concentrated titanyl sulfate solution is gradually added into a dilute titanyl sulfate solution at nearly a boiling state to raise the concentration of titanyl-iron sulfate and then water heated to 90°–95° C. is added thereto in an amount of ¼ in volume relative to the titanyl sulfate solution.

This method is disadvantageous in that as much as 5–6% of the titanyl sulfate remains in the solution without converting to titanium hydroxide and is discarded even though the total sulfuric acid concentration in the hydrolyzed aqueous solution is 350–400 g/l $H_2SO_4$, while 94% to 95% of the titanyl sulfate precipitates as a hydroxide.

A solvent extraction technology for titanium oxide manufacture is disclosed in U.S. Pat. No. 3,067,010. This technology relates to a selective extraction of a titanium ion species from the sulfuric acid solution by contact with an organic solvent containing an alkyl-phosphoric acid to separate titanium from iron in titanyl-iron sulfate in the sulfuric acid solution. This method is disadvantageous in that the iron is co-extracted in a large amount and that the 5-6N HCl for removal of the iron, and HF and $NH_3$ for inverse extraction of Ti from the organic phase are less economical in comparison with the conventional methods of hydrolysis for titanium hydroxide manufacture.

Methods for separating titanium ions and iron ions contained in a chloride solutions are disclosed in U.S. Pat. Nos. 3,795,727 and 3,104,950. The both methods relate to extraction of iron chloride complex from an aqueous solution, and have many disadvantages such that the total HCl concentration in the aqueous solution employed have to be sufficiently high, that the extracting agents are significantly soluble in the aqueous solution, and that the titanium is coexisting with impurity metal ions other than iron, which requires further purification.

A further method was presented at the meeting of Metallurgical Society of AIME held on February 16–20, 1969 regarding selective removal of Cr (III) ions by extraction, by use of a primary amine, from a waste sulfuric acid solution containing Ti ions and Cr (III) ions for the purpose of recycling the sulfuric acid. Still further, a method is described regarding selective removal of Cr (VI) ions from a sulfuric acid solution containing Ti ions and Cr ions by use of a tertiary or quaternary alkylamine in Ind. Eng. Chem. Prod. Res. Develop, Vol. 9, No. 3, 1970. The both methods, however, relates to extraction of Cr ions and Nb ions as impurities in a form of a sulfate complex without extracting Ti ions in the sulfuric acid solution and with Ti ions kept in the aqueous solution. Accordingly, these methods are different in principle from the present invention in which Ti ion is extracted and is further purified.

SUMMARY OF THE INVENTION

The disadvantages of prior art mentioned above are eliminated, as set forth in Claim 1 of the present invention, by extraction of titanium-sulfate complex with an organic solvent, inverse extraction of titanium from the organic solvent with water or an aqueous dilute sulfuric acid, and recycle of the resulting aqueous solution to hydrolysis or leaching of the titanyl sulfate. Such a method of the present invention allows prevention of loss of titanium oxide remaining unrecovered in the hydrolyzed solution and causing pollution problems. Thus the titanyl sulfate is totally converted to titanium hydroxide and then fired into titanium oxide.

The efficiency of the inverse extraction is improved by adding a reducing agent into the water or the aqueous dilute sulfuric acid solution employed for the inverse extraction of titanium from the organic solvent. Otherwise, the efficiency of the inverse extraction is improved by bringing the organic solvent into contact with a reducing agent prior to the inverse extraction and then conducting inverse extraction of titanium from the organic phase to water or an aqueous dilute sulfuric acid solution. Since water balance can be maintained well even when the aqueous solution is recycled repeatedly, the dissolved titanium in the (aqueous) solution separated after the hydrolysis can be converted totally to titanium hydroxide: in other words, all the titanium contained in the starting titanyl-iron sulfate solution is recovered as titanium hydroxide.

According to an aspect of the present invention, there is provided a method for manufacturing titanium oxide, comprising bringing a sulfuric acid solution containing predominantly titanium ion together with one or more kinds of metal ions into contact with an organic solvent containing one or more species selected from the group of oxygen-containing organic solvents, alkyl amines, and alkyl aryl amines to extract the titanium ions in a form of a sulfuric acid complex from the sulfuric acid solution, and bringing the organic solvent containing the extracted titanium into contact with water or an aqueous dilute sulfuric acid solution to inversely extract the titanium from the organic solvent to the water or the dilute sulfuric acid solution and to regenerate the organic solvent.

According to another aspect of the present invention, there is provided a method for manufacturing titanium oxide, comprising a first step of bringing a sulfuric acid solution containing predominantly titanium ions together with one or more kinds of metal ions including iron ions into contact with a first organic solvent (A) containing one or more species selected from the group of oxygen-containing organic solvents, alkyl amines, and alkyl aryl amines to extract the titanium ions in a form of a sulfuric acid complex from the sulfuric acid solution to the first organic solvent, leaving the sulfuric acid as a raffinate, and bringing the organic solvent containing the extracted titanium into contact with water or an aqueous dilute sulfuric acid solution to inversely extract the titanium from the organic solvent to the water or the dilute sulfuric acid solution and to regenerate the first organic solvent (A); and a second step of adding, to the raffinate resulting from the first step, at least one compound selected from the group of chlorides of Na, K, Mg, Ca, and $NH_4$ in an amount equivalent chemically to the sum of free $SO_4$ ions and iron-bonded $SO_4$ ions in the raffinate, and subsequently bringing said raffinate into contact with a second organic solvent (B) containing one or more of the species selected from the group consisting of oxygen-containing organic solvents, alkyl amines and alkyl aryl amines to extract iron ions as a chloride complex from the raffinate to the second organic solvent (B); and thereafter bringing the second organic solvent (B) containing iron ions and chloride ions into contact with water to inversely extract the iron ions and the chloride ions from the second organic solvent to the water and to regenerate the second organic solvent (B).

According to still another aspect of the present invention, there is provided a method for manufacturing titanium oxide, comprising bringing a sulfuric acid solution containing predominantly titanium ions and additionally one or more metal ions including iron ions into contact with an organic solvent containing one or more of the species selected from oxygen-containing organic solvents, alkyl amines, and alkyl aryl amines, and thereafter introducing the sulfuric acid solution to an evaporation-concentration step operated at a reduced or normal pressure to recover concentrated sulfuric acid, thus decreasing the quantity of the sulfated titanium formed at the evaporation-concentration step.

According to a further aspect of the present invention, there is provided a method for manufacturing titanium oxide, comprising adding, to a sulfuric acid solution containing predominantly titanium and additionally one or more of iron and other metal ions, at least one species selected from the group of the chlorides of H, Na, Mg, K, Ca, and $NH_4$ in an amount of addition required to form chloride complex of the titanium ion in the sulfuric acid solution, thereafter bringing the sulfuric acid solution into contact with an organic solvent containing at least one species selected from oxygen containing organic solvents, alkyl amines, and alkyl aryl amines to extract the titanium from the sulfuric acid solution in a form of a chloride complex, and subsequently bringing the organic solvent containing titanium ions and chloride ions into contact with water to inversely extract the titanium ions and the chloride ions from the organic solvent to the water and to regenerate the organic solvent.

BRIEF DESCRIPTION OF THE DRAWINGS

In FIG. 9, the (aqueous) solution from which the titanium has been removed by extraction (with the organic solvent) is concentrated, and the resulting concentrated sulfuric acid is recycled.

In FIG. 10, an alkali is added to the aqueous solution which contains titanium recovered by inverse extraction to recover titanium hydroxide.

In FIG. 11, the titanyl-iron sulfate solution is subjected to hydrolysis. The insoluble titanium hydroxide formed is removed off. To the sulfuric acid solution, a substance is added which is selected from the compounds of Na and Cl; Mg and Cl; $NH_4$ and Cl; K and Cl and Ca and Cl; and HCl. Thereafter titanium is extracted as a chloride complex. The organic solvent containing the extracted titanium is brought into contact with water, whereby titanium is inversely extracted from the organic phase to the aqueous phase. To the resulting aqueous solution containing recovered titanium, an alkali is added to recover titanium hydroxide. The method for neutralization treatment of the sulfuric acid after extractive removal of titanium is conducted in the same manner as in FIG. 6.

DETAILED DESCRIPTION OF THE PREFERRED EMBODIMENT

Figure 1:
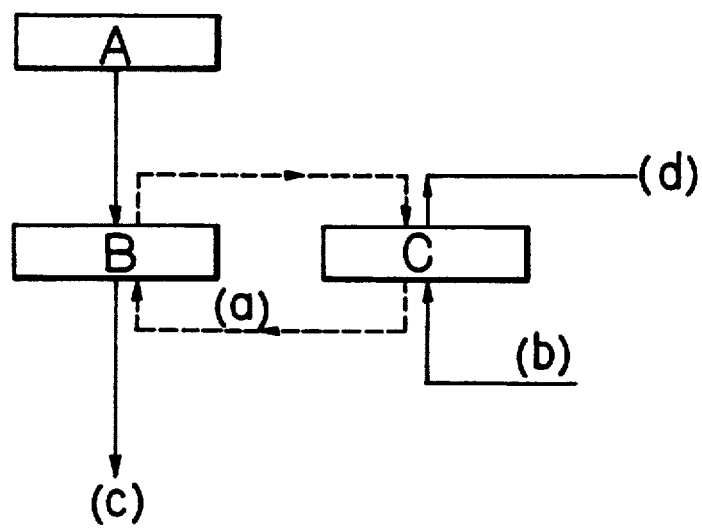
FIG. 1 is a flow sheet illustrating the prototype of the present invention.

Any titanyl iron sulfate solution may be used in the present invention as a starting material regardless of the preparation method thereof in the present invention. Conventionally employed titanium and iron sulfate solution is prepared through the steps of finely pulverizing titanium-iron ore (ilumenite or anatase) or titanium-concentrated material such as titanium ore slag, agitating it with concentrated sulfuric acid to cause aging at a high temperature, leaching it with water or dilute sulfuric acid, adding iron scrap to reduce ferric sulfate to ferrous sulfate, cooling the solution to remove iron sulfate ($FeSO_4 \cdot 7H_2O$), and removing a solid matter.

An example of the titanium iron solution contains 240–260 g/l of $TiO_2$, 40–50 g/l of $Fe^{2+}$, 200–300 g/l of free sulfuric acid, 500–800 g/l of the total sulfuric acid, and metal ions of Mn, V, Mg, Al, Cr, and Nb.

Insoluble titanium hydroxide is prepared from titanium-iron solution by hydrolysis in various methods including those disclosed by U.S. Pat. No. 2,253,595 and British Patent 558,285. Generally, the insoluble titanium hydroxide is prepared by gradually adding titanium iron solution of a high concentration obtained through leaching the raw material into a low concentration solution of titanyl sulfate at a boiling state to form a concentrated titanyl sulfate-iron solution, and adding, to the titanium-iron solution kept at 95°–105° C. approximately ¼ amount in volume of water maintained at 90°–95° C. relative to the titanium-iron solution. On completion of the hydrolysis, the total sulfuric acid concentration in the solution is in a range of 320–450 g/l, and the titanium ion remaining unhydrolyzed in the water solution is in the range of 7–10 g/l as $TiO_2$, which means that 94–95% of the total titanyl sulfate is converted to titanium hydroxide.

In the present invention, the Ti ion remaining in the hydrolyzed solution is extracted by contact with an organic solvent containing one or more of the species selected from the group of oxygen-containing organic solvents, alkyl amines, and alkyl aryl amines, whereby the titanium ion in the sulfuric acid solution is extracted into the organic phase as a complex shown in the formulas below as an example, being separated from other metals.

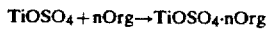

TiOSO$_4$ + nOrg → TiOSO$_4$·nOrg

TiOSO$_4$ + H$_2$SO$_4$ + nOrg → H$_2$TiO(SO$_4$)$_2$·nOrg

The above formulas show only examples of the extraction reaction. It should be understood that the reaction depends on the concentration of SO$_4$ in the aqueous solution, the concentration of the co-existing metal ions and the kind of existing anion, and that the chemical species of the titanium extracted depends on the extracting agent employed.

The sulfuric acid complex of titanium extracted into an organic solvent containing a species selected from the group of oxygen-containing organic solvent, alkyl amines and alkyl aryl amines is transferred to an aqueous phase when the complex is brought into contact with water or a dilute sulfuric acid as shown for example in the formulas below, and the organic solvent is regenerated.

TiOSO$_4$·nOrg + water → TiOSO$_4$ + nOrg

H$_2$TiO(SO$_4$)$_2$·nOrg + water → TiOSO$_4$ + H$_2$SO$_4$ + nOrg

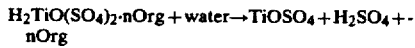

TiOSO$_4$·nOrg + dil.H$_2$SO$_4$ → TiOSO$_4$ + H$_2$SO$_4$ + nOrg

Hydrazine, hydrazine sulfate, Na$_2$SO$_3$, NaHSO$_3$, Na$_2$S$_2$O$_4$, (COOH)$_2$, and ascrobic acid, or the like, when added to the water of the dilute sulfuric solution for the inverse extraction, will increase the efficiency of the inverse extraction, and will allow the recovery of titanium in a high concentration:

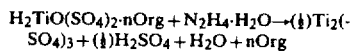

H$_2$TiO(SO$_4$)$_2$·nOrg + N$_2$H$_4$·H$_2$O → (½)Ti$_2$(SO$_4$)$_3$ + (½)H$_2$SO$_4$ + H$_2$O + nOrg

The above formula shows only an example of the reaction in the inverse extraction. The titanium ion is not always entirely converted to $Ti^{3+}$ ion because the conversion depends on the amount of the reducing agent. A very small amount of titanium may remain unreduced, or it may, after transferred to the aqueous phase, be re-oxidized to $Ti^{4+}$ ion.

Further it should be understood that the state of titanium species will depend upon the contact condition of the organic phase with the reducing agent before the inverse extraction and upon the kind of the extracting agent employed.

The solution containing the inversely-extracted titanium having a low concentration of sulfuric acid is recycled repeatedly either for hydrolysis of titanyl sulfate solution or for leaching the solid titanyl sulfate resulting from the reaction of titanium-iron ore with concentrated sulfuric acid, and thus the titanium is recovered as titanium hydroxide.

The aqueous solution containing inversely-extracted titanium can also be used for preparation of titanium hydroxide by addition of an alkali thereto since the solution contains no other metallic ion.

The oxygen-containing organic solvent employed in the present invention is selected form the groups below:

(a) Esters

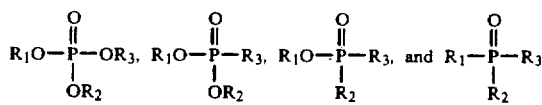

wherein $R_1$, $R_2$, and $R_3$ represent alkyl radicals and aryl radicals having 4 to 18 carbons, including cases where the alkyl radicals or the aryl radicals differ from each other or alkyl and aryl radicals are mixedly employed, namely $R_1 = R_2 = R_3$, $R_1 = R_2 \neq R_3$, or $R_1 \neq R_2 \neq R_3$.

(b) Alcohols

Primary, secondary, and tertially alcohol having 6 to 18 carbon atoms.

(c) Amides

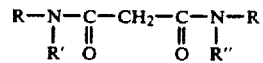

wherein R, R', and R" represent respectively an alkyl radical or an aryl radical having 4 to 22 carbons, including cases where the radicals differ from each other or alkyl and aryl radicals are mixedly employed, namely $R = R' = R''$, $R = R' \neq R''$, or $R \neq R' \neq R''$.

The alkyl amines and alkyl aryl amines employed in the present invention is selected from the groups below:

(a) Primary amines

A primary amine represented by $RNH_2$ where R is an alkyl or aryl radical having 4 to 24 carbons. One example of the amines used in the experiments is as below:

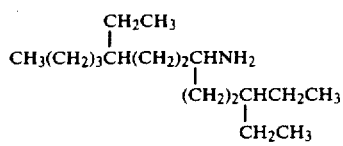

(b) Secondary amines

A secondary amine represented by $R_2NH$ where R is an alkyl or aryl radical having 4 to 24 carbons. An example is as shown below:

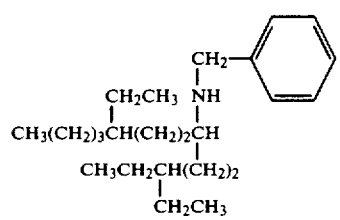

Petroleum hydrocarbons used for dilution of the extracting agent in the present invention include aromatic hydrocarbons, an aliphatic hydrocarbons and a mixture thereof. Kerosine, a mixture of various hydrocarbons, is frequently used.

The typical compound containing Na and Cl employed in the present invention is rock salt (NaCl) the purity of which is not limited. $NaClO_x$ may also be employed. Further, seawater or an industrial waste may naturally be employed also.

The compounds containing Ca and Cl; Na and $SO_4$; $NH_4$ and Cl; $NH_4$ and $SO_4$; K and Cl; or K and $SO_4$ may be obtained from industrial waste which are exhausted in large quantities, irrespectively of the purity thereof.

The compound containing Mg and Cl, or Mg and $SO_4$ in the present invention may be used also irrespectively of the purity thereof.

The reducing agent employed in the present invention is a species or a mixture of two or more thereof such as $H_2$, CO, $CO_2$, $SO_2$, $H_2S$, $Na_2S$, NaHS, $NaC_2O_4$, $NH_4C_2O_4$, $CH_3COOH$, $CH_3COONH_4$, $CH_3COONa$, $NaHSO_3$, $Na_2SO_3$, $Na_2S_2O_4$, $NH_4HSO_3$, $KHSO_3$, $(NH_4)_2SO_3$, $Na_2S_2O_3$, $K_2S_2O_3$, $(NH_4)_2S_2O_3$, metallic iron, metallic zinc, hydrazine hydrate, hydrazine sulfate, citric acid, malic acid, gluconic acid, urea, $(NH_4)_2CO_3$, $NH_4HCO_3$, and ascorbic acid.

The dilute sulfuric acid used for inverse extraction in the present invention is in a concentration of not more than 250 g $H_2SO_4$ per liter in the case where it is used solely without a reducing agent added, but the concentration may be up to 300 g $H_2SO_4$ per liter in the case where the extracting agent is contained in a concentration of not more than 5%. In the case where a reducing agent is mixed (to the organic solvent) in the inverse extraction, the concentration of the sulfuric acid is not limited specifically.

The embodiment of the present invention will be described in more detail on the basis of the drawings. The present invention, however, is not limited by the description.

FIG. 1 is a prototype of the present invention, where a titanyl sulfate solution A containing impurity metal ions is introduced to the step B and is brought into contact with an organic solvent (a) containing an extractant selected from the group of oxygen-containing solvents, alkyl amines, and alkyl aryl amines to extract titanyl sulfate from the sulfuric acid solution to an organic phase in a form of a sulfuric acid complex. The organic solvent (a) containing the extracted titanium is transferred to the inverse extraction step C where, in contact with water or aqueous dilute sulfuric acid (b), titanium is inversely extracted into an aqueous solution, and the organic solvent (a) is regenerated and recycled.

The raffinate (c) is subsequently transferred to an acid recovery step or a neutralization step. The liquid (d) after completion of the inverse extraction is led to a hydrolysis step where titanium hydroxide is derived. The titanium hydroxide is fired into titanium dioxide.

Figure 2:
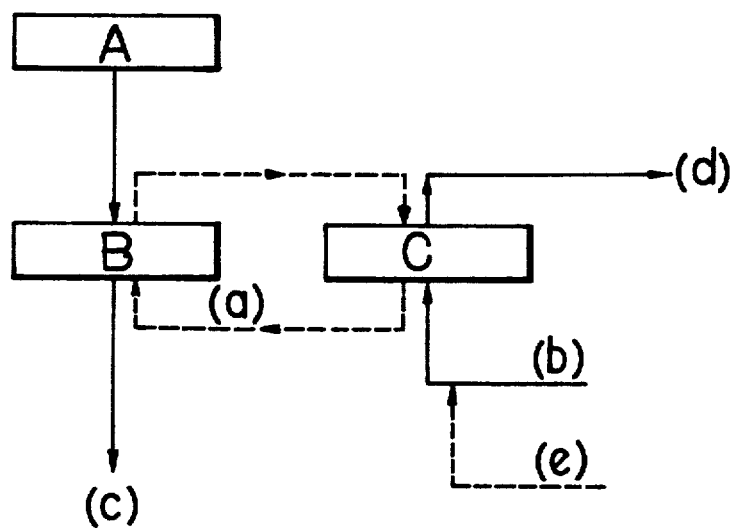
FIG. 2 shows a modification made by attaching an operation of adding a reducing agent to water or an aqueous dilute sulfuric acid solution for inverse extraction to improve the efficiency of inverse extraction of titanium from the organic phase.

FIG. 2 is a flow sheet similar to FIG. 1. In FIG. 2, for the purpose of improving the efficiency of the inverse extraction, a reducing agent (e) is added to water or an aqueous dilute sulfuric acid solution (b) serving as the inverse extraction liquid at the inverse extraction step C where titanium is extracted to the aqueous phase by contact with the organic solvent (a) containing titanium and entering the inverse extraction step C.

Figure 3:
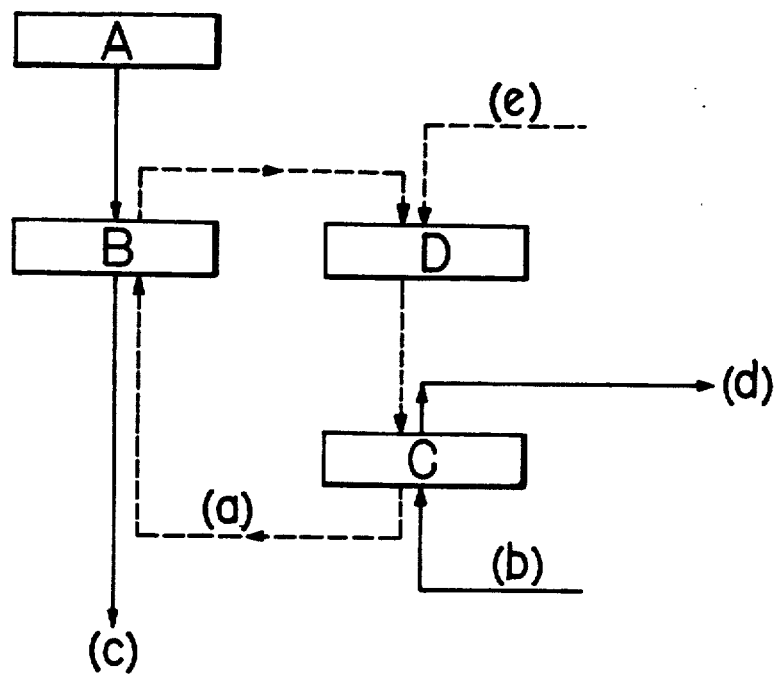
FIG. 3 shows another modification made by an additional step of bringing the titanium into contact with a reducing agent before the titanium in an organic phase is introduced to an inverse extraction step to improve the inverse extraction efficiency.

FIG. 3 is also a flow sheet similar to FIG. 1 and FIG. 2, illustrating a basic process of the present invention. In FIG. 3, the organic solvent (a) containing titanium is, prior to the inverse extraction, led to a reduction step D where the valency of the titanium in the organic phase is changed under the action of a reducing agent (e) added thereto, and subsequently the titanium is brought into contact with water or an aqueous dilute sulfuric acid solution (b) in the inverse extraction step C and is inversely extracted into the aqueous phase, thus improving the efficiency of the inverse extraction.

Figure 4:
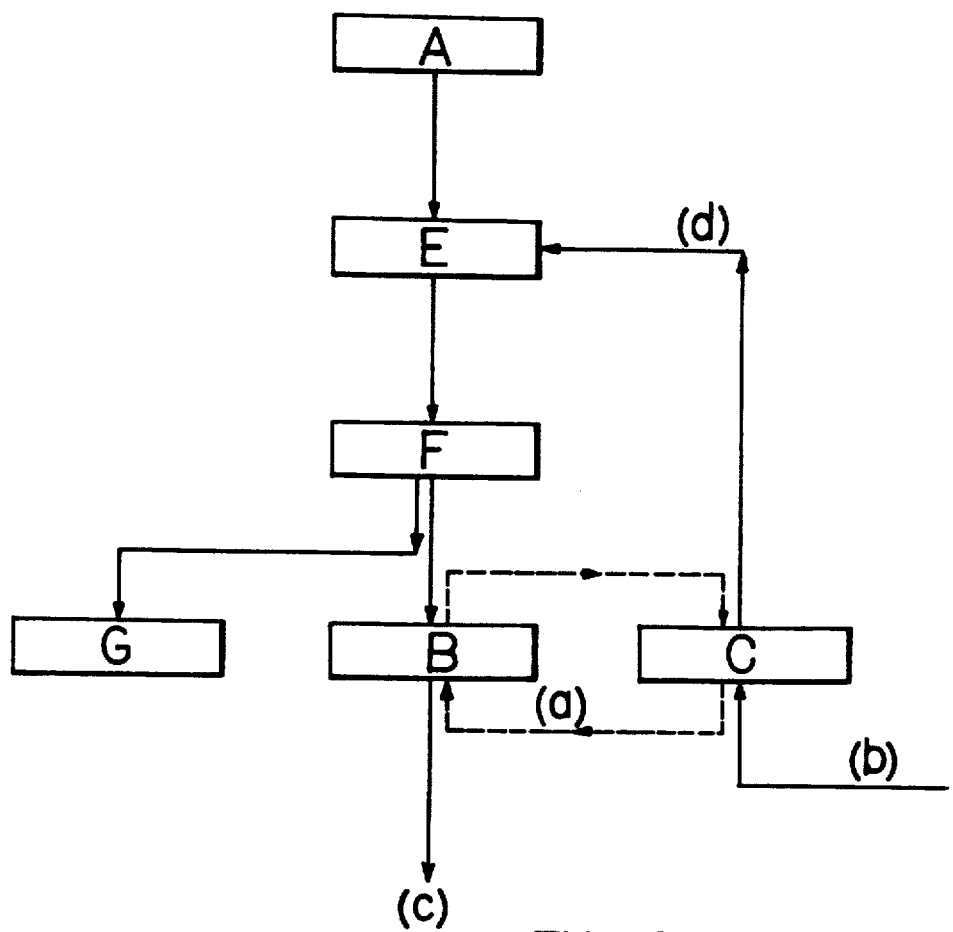
FIG. 4 is a flow sheet illustrating a further modification of the process. In this process, water or an inverse extraction liquid containing titanium is added to an titanyl-iron sulfate solution in a hydrolysis step to precipitate most portion of the titanium from the sulfuric solution in a form of insoluble titanium hydroxide. The titanium remaining in the filtrate is extracted (by an organic solvent) as a sulfuric acid complex. The organic solvent containing the extracted titanium is led to an inverse extraction step to come into contact with water or an aqueous dilute sulfuric acid solution, whereby the titanium is inversely extracted from the organic solvent to the aqueous solution which is recycled to hydrolysis.

FIG. 4 shows a combination of the process of the present invention with a conventional sulfuric acid process for manufacturing titanium oxide. In FIG. 4, to the titanyl sulfate solution A containing much impurity metal ions and being kept boiling at the hydrolysis step E, water or dilute titanyl sulfate solution (d) is added to form insoluble titanium hydroxide while the total concentration in the titanyl sulfate solution is being lowered. The titanium hydroxide G is separated at a filtration step F from the sulfuric acid solution containing titanium ion as well as other metal ions of Fe, Mn, Al, Cr, V, Mg, Nb, Zn, etc. The filtrate is led to the extraction step B, and brought into contact with an organic solvent (a) containing an extractant selected from the group of oxygen-containing organic solvents, alkyl amines, and alkyl aryl amines to extract the titanium ions from the sulfuric acid solution into an organic phase in a form of sulfuric acid complex. The organic solvent (a) containing the titanium is introduced to an inverse extraction step C and is brought into contact with water of dilute sulfuric acid (b) to inversely extract the titanium to the aqueous solution, and thus the organic solvent (a) is regenerated and recycled. The solution (d) having completed the inverse extraction is introduced to the hydrolysis step E, and the titanium is recovered as titanium hydroxide and fired into titanium oxide.

Figure 5:
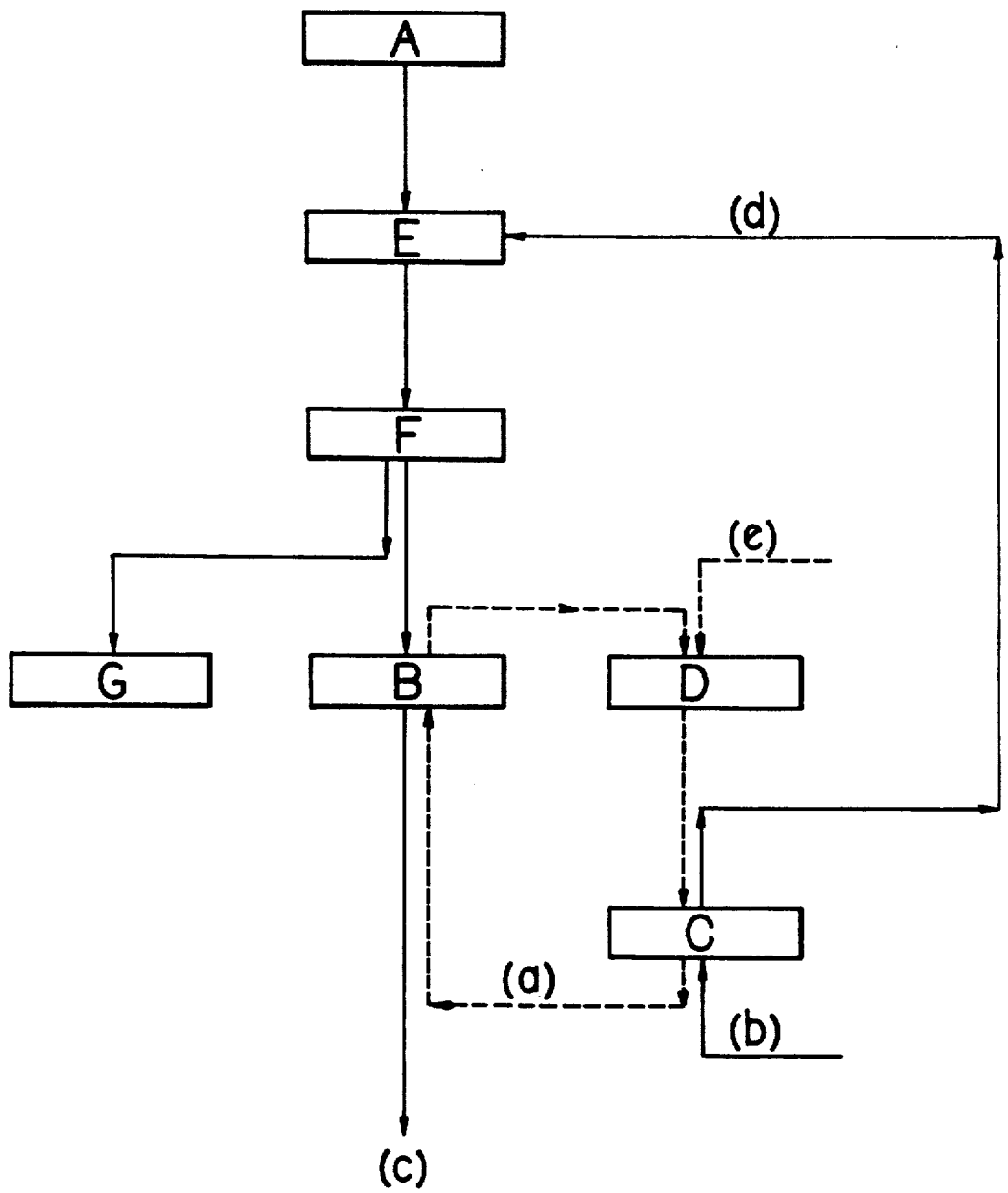
FIG. 5 is a process resulting from combination of FIG. 3 and FIG. 4.

FIG. 5 shows a flow sheet according to a combination of the processes of FIG. 3 and FIG. 4 for manufacturing titanium oxide.

Figure 6:
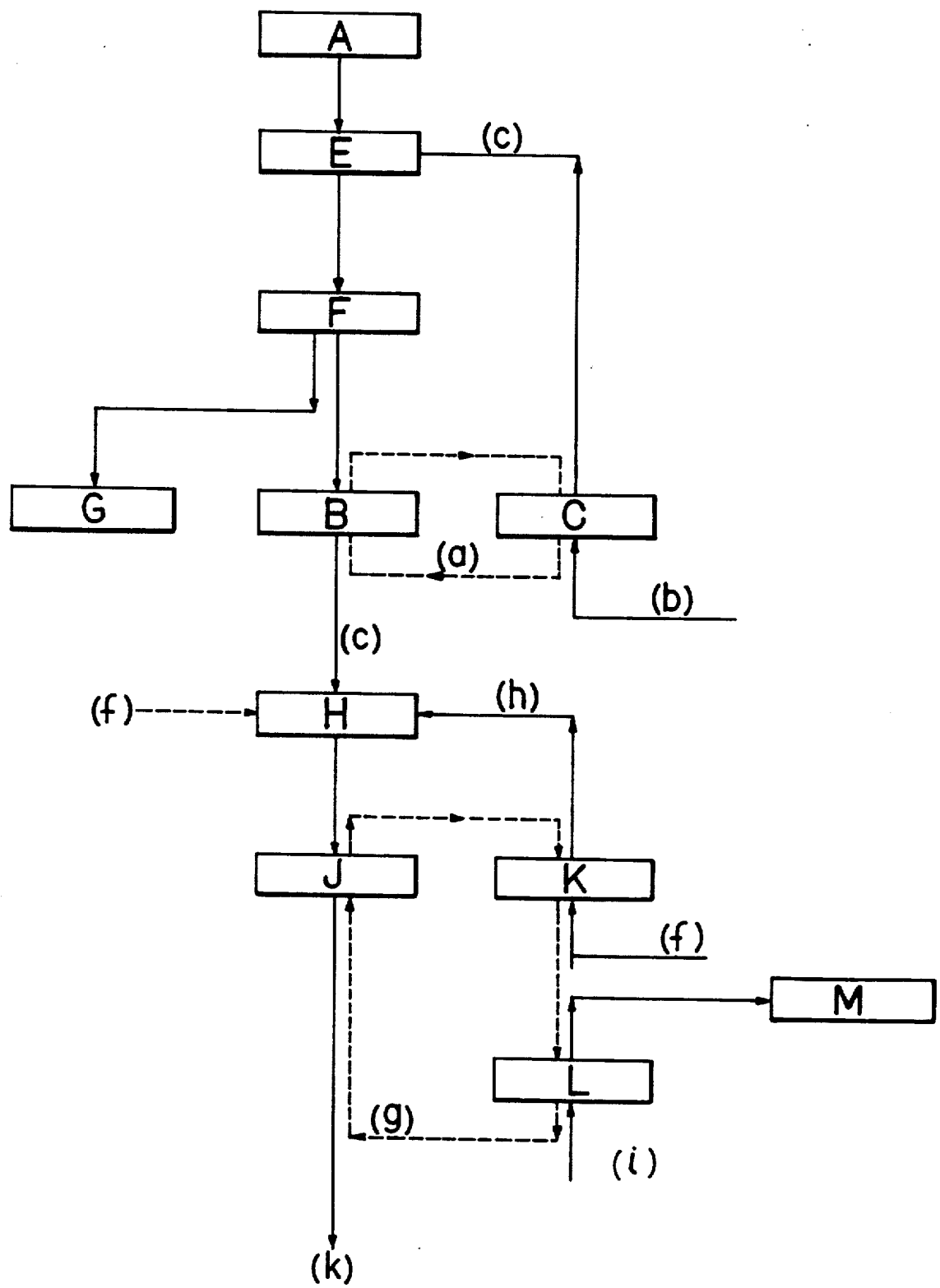
FIG. 6 illustrates a subsequent process added to the process of FIG. 4, where rock salt is added to the raffinate and the mixture is oxidized to change the iron ion in the raffinate to chlorides, and then the iron ion complex with chlorides is extracted and neutralized.

FIG. 6 is a flow sheet which is basically the same as that of FIG. 4 except that a neutralization step for the titanium raffinate (c) is incorporated. In FIG. 6, the raffinate after titanium ion extraction is introduced to chloridization-oxidation step H, where at least one compound is added thereto which is selected from the group of the chlorides of Na, NH$_4$, K, Ca, and Mg in an amount equivalent chemically to the total of free SO$_4$ ions and SO$_4$ ions combined to Fe ions. The solution is then led to a chloride-complex-extraction step J, where it is brought into contact with an organic solvent (g) containing one or more of the species selected from the group of oxygen-containing organic solvents, alkyl amines, and alkyl aryl amines, so that the Fe ions in the sulfuric acid solution are extracted as an chloride complex, giving a neutralized solution (k).

On the other hand, the Fe ions and the Cl ions extracted into the organic phase are brought into contact with water (j), in the inverse extraction step L to be inversely extracted into the aqueous solution, giving an iron-chloride-containing solution M and simultaneously regenerating the organic solvent (g).

In the case where an oxidizing agent containing NO$_3$ such as HNO$_3$, NaNO$_3$, NH$_4$NO$_3$, and the like is employed in the chloridization-oxidation step H, HNO$_3$ is extracted in the extraction step J together with the Fe ions and the Cl ions. The organic solvent containing the co-extracted HNO$_3$ is recovered in washing step K for selective removal of HNO$_3$ by contact with an aqueous solution containing one or more of the species selected from the compounds of Na and Cl; Mg and Cl; K and Cl; NH$_4$ and Cl; and Fe and Cl, transferring NHO$_3$ from the organic phase to the aqueous solution which is recycled to chloridization-oxidation step, whereby the substances contained therein such as NaCl and HNO$_3$ are reused. The process of FIG. 6 is also an advantageous method for manufacturing titanium oxide.

Figure 7:
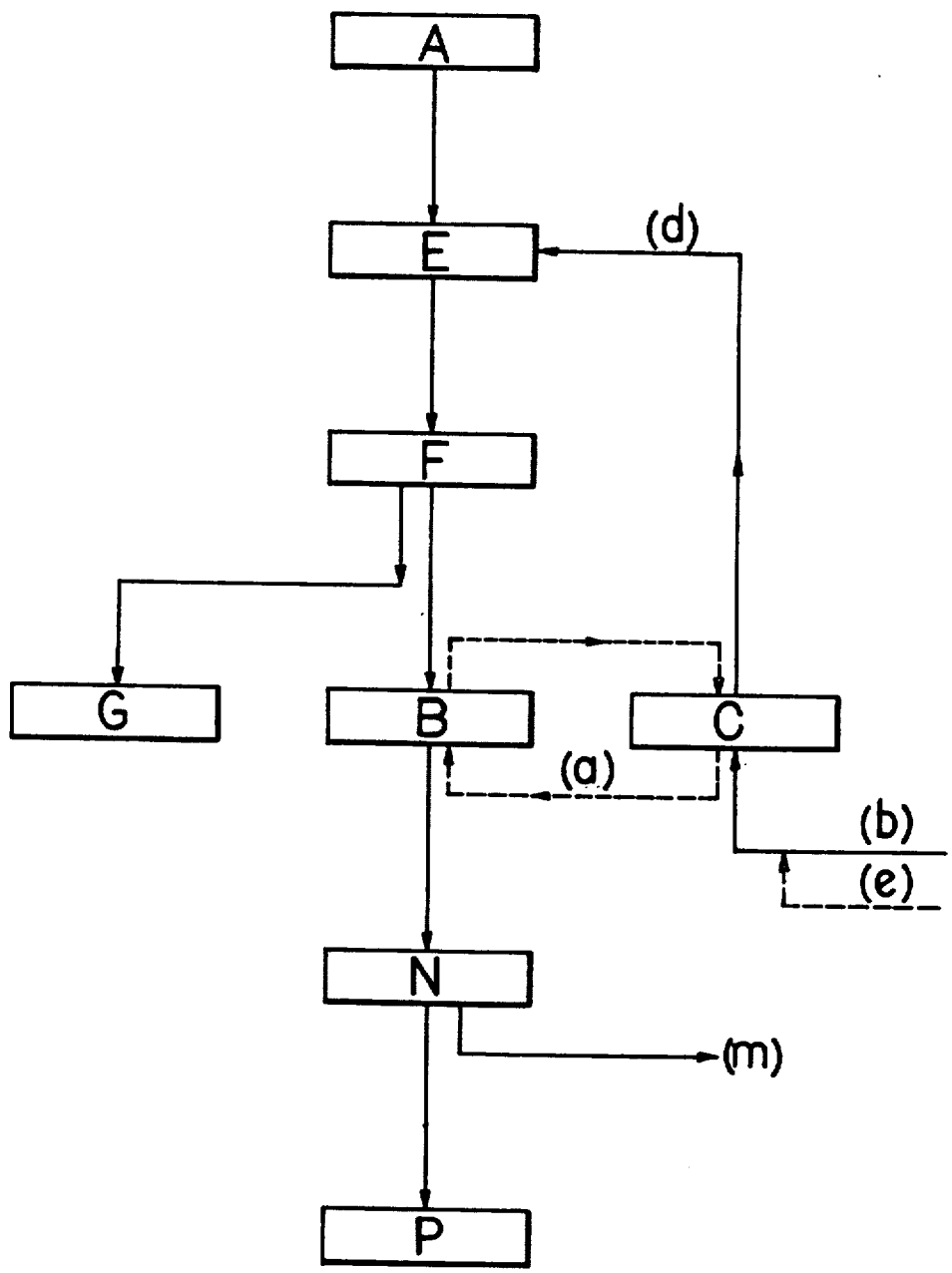
FIG. 7 illustrates an effect of the present invention in concentration and recovery of the sulfuric acid solution after extractive removal of titanium subsequent to the process of FIG. 4.

FIG. 7 is a flow sheet basically the same as that of FIG. 4. FIG. 7 shows the advantage of the present invention in treating the sulfuric acid solution from which titanium is extracted off in the extraction step B. In this process, the raffinate is introduced to an evaporation-concentration step N operated under a reduced or normal pressure to decrease the volume of metal sulfate P discharged when a high concentration of sulfuric acid (m) is recovered for recycle, which is advantageous in manufacturing titanium oxide.

Figure 8:
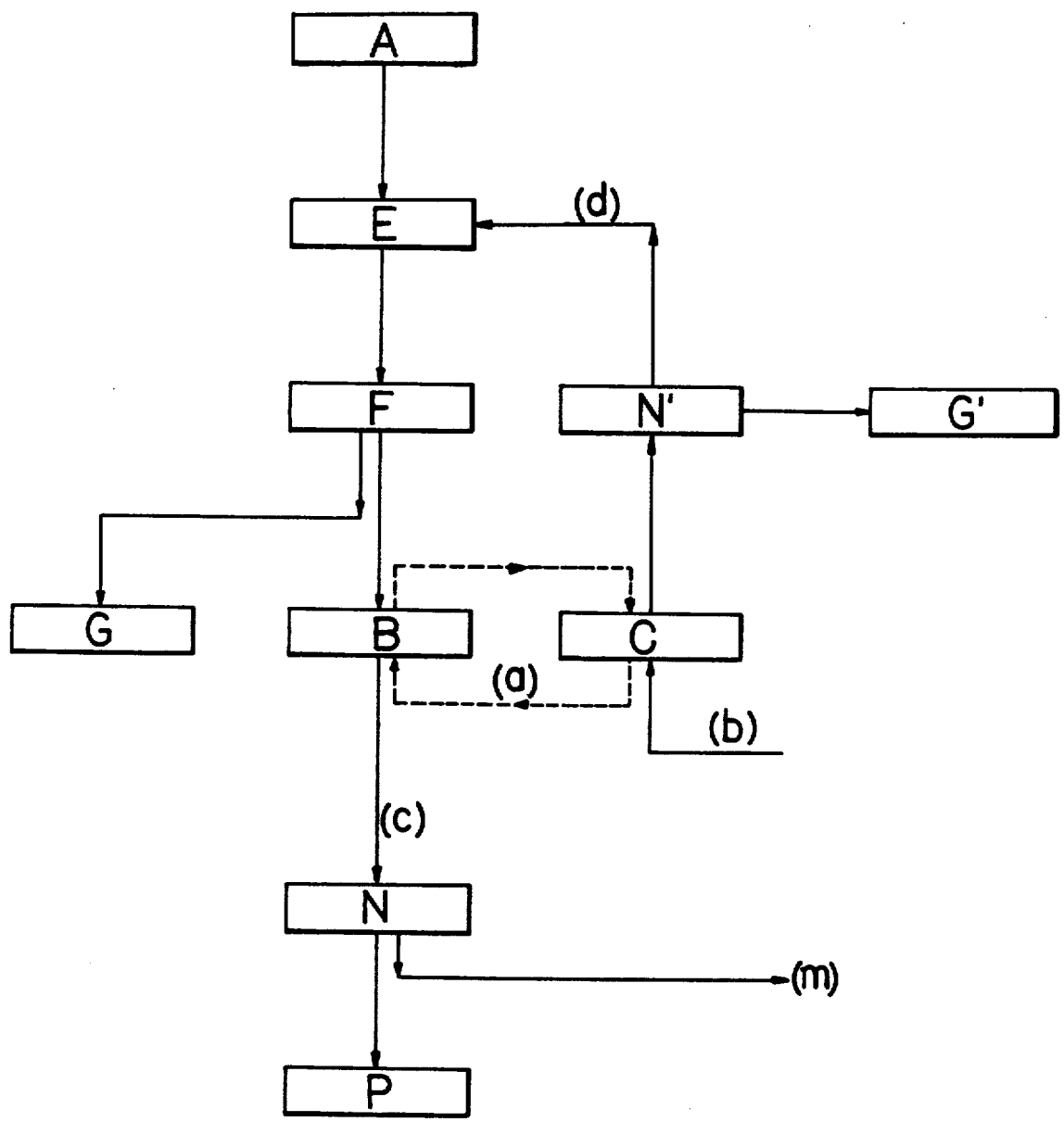
FIG. 8 illustrates a process of titanium hydroxide recovery where titanium recovery liquid is heated and subjected to hydrolysis to recover titanium hydroxide, and the solution is then recycled to the process similar to FIG. 4 or FIG. 7.

FIG. 8 is a flow sheet of manufacturing titanium oxide which is basically the same as that of FIG. 7. In the process of FIG. 8, titanium hydroxide G' is recovered from a titanium-containing aqueous solution (d) at a concentration step N' prior to the recycle, to the hydrolysis step E, of the aqueous solution (d) containing titanium inversely extracted from the organic phase at the inverse extraction step C by bringing the organic solvent (a) containing extracted titanium into contact with water, an aqueous dilute sulfuric acid solution, or a reducing-agent-containing inverse extraction liquid, and then it is recycled to the hydrolysis step E.

Figure 9:
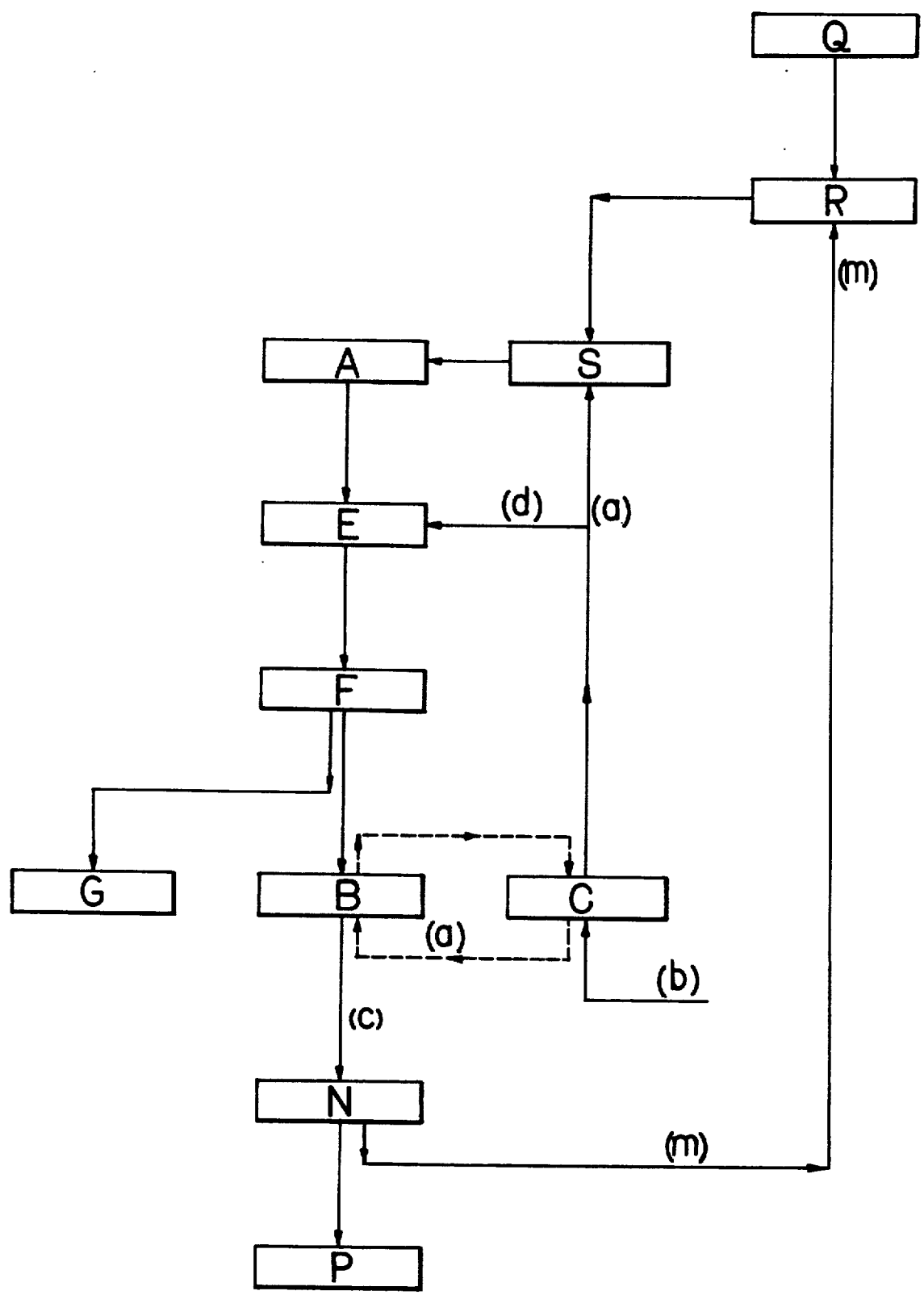
FIG. 9 is fundamentally similar to FIG. 7.

FIG. 9 is a flow sheet of manufacturing titanium oxide which is basically the same as that of FIG. 7. In the process of FIG. 9, the concentrated sulfuric acid (m) derived form the evaporation-concentration step N operated under a reduced or ordinary pressure is recycled to the sulfation step R where the concentrated sulfuric acid is mixed with titanium-iron ore (ilmenite or anatase) or titanium-concentrated slag Q to change the titanium in the raw material into titanyl sulfate. The mixture is subsequently leached at a leaching step S where titanyl sulfate solution A containing much impurity is derived by use of water or inverse extraction liquid (d).

Figure 10:
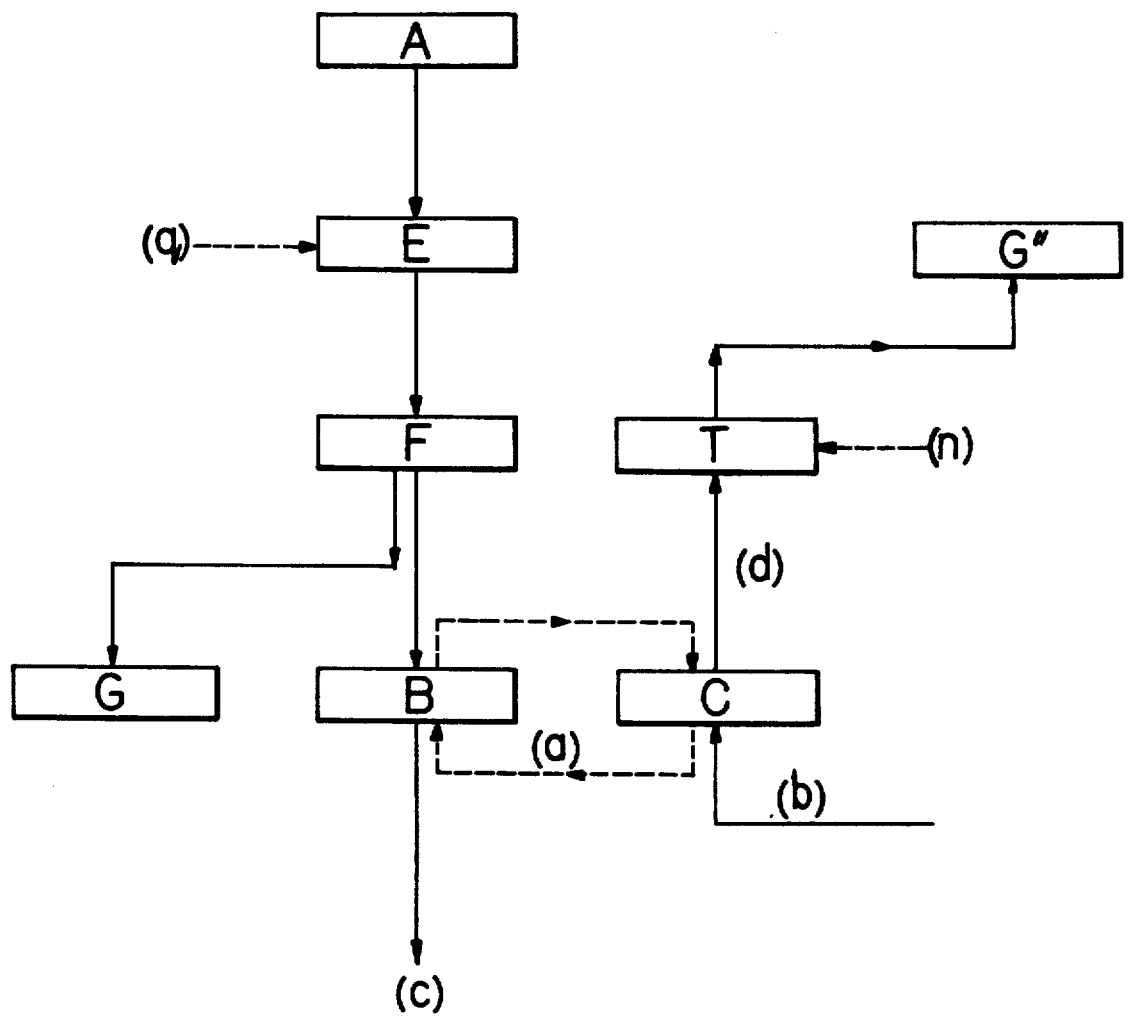
FIG. 10 is fundamentally similar to FIG. 8.

FIG. 10 is a flow sheet of manufacturing titanium oxide which is basically the same as that of FIG. 4. In the process of FIG. 10, the aqueous solution (d) resulting from the inverse extraction of titanium by contact of the organic solvent (a) containing extracted titanium with water or dilute sulfuric acid (b) to inversely extract titanium to the aqueous phase is introduced to a neutralization step T, where an alkali (n) is added to give titanium hydroxide G" having excellent adsorbing property.

Figure 11:
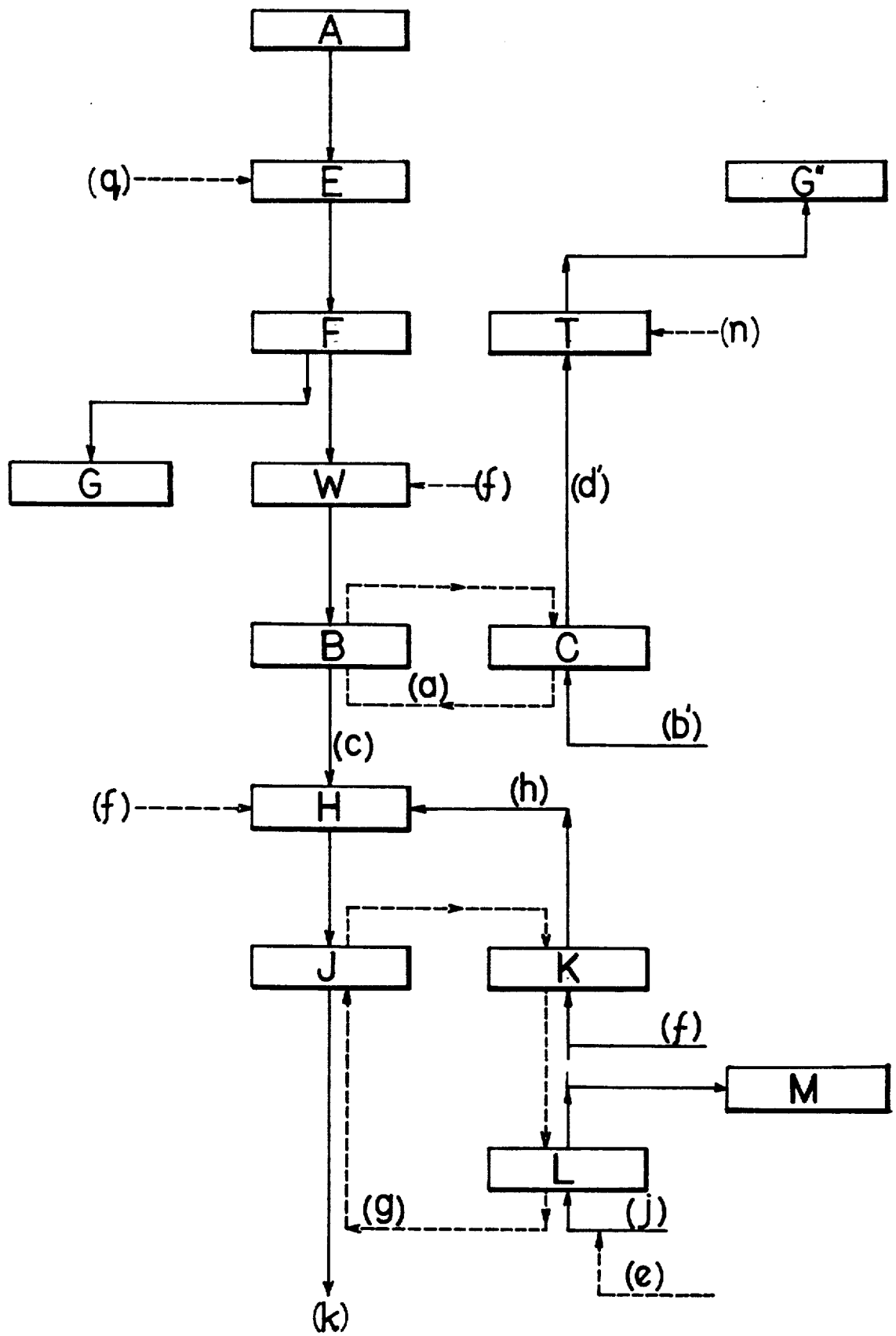
FIG. 11 illustrates a method for recovering titanium hydroxide.

FIG. 11 is a flow sheet of an advantageous method of manufacture of titanium oxide which is basically the same as that of FIG. 6. In the process of FIG. 11, the aqueous sulfuric acid solution containing titanium and impurity ions which is obtained by addition of water (q) conventionally in hydrolysis step E and filtration of the resulting titanium hydroxide in the filtration step F is led to a chloridization step W for titanium, where a substance (f) is added which is selected from the group of the compounds of Na and Cl; Mg and Cl; NH$_4$ and Cl; K and Cl; and HCl in an amount equivalent chemically to the chlorine sufficient for forming chloride of titanium contained in the sulfuric acid solution. The solution is subsequently led to the extraction step B where the titanium in the sulfuric acid solution is extracted in a form of a chloride complex by contact with organic solvent (a) containing an extractant selected from the group of oxygen-containing organic solvents, alkyl amines, and alkyl aryl amines. Further, in the subsequent inverse extraction step C, the Ti ions and Cl ions in the organic phase is inversely extracted by contact with water (b) into the aqueous phase. The resulting aqueous solution (d') is introduced to a neutralization step T where alkali (n) is added to give titanium hydroxide G".

Example 1

The composition of the starting liquid for the experiment is shown in Table 1.

TABLE 1

| Starting Solution for TiOSO$_4$ Extraction | | | | | | |
|---|---|---|---|---|---|---|
| | | | | | | (Unit: g/l) |
| Total H$_2$SO$_4$ | Total HCl | Ti | Fe | Zn | Mn | Al |
| 401.1 | <0.1 | 4.99 | 51.4 | 0.18 | 8.1 | 0.2 |

The extracting agents used in the comparative experiments for extraction are selected from the group of alkylphosphine oxides and the group of alkylamines.

TABLE 2

| | Comparison of Raffinate | | | | | |
|---|---|---|---|---|---|---|
| | | | | | | (Unit: g/l) |
| Extracting Agent | Total H$_2$SO$_4$ | Ti | Fe | Zn | Mn | Al |
| 20% Primen JMT | 380.4 | <0.01 | 51.4 | 0.17 | 8.1 | 0.2 |
| 15% LA-1 | 391.6 | 2.21 | 51.4 | 0.18 | 8.1 | 0.2 |
| 10% Alamine 336 | 401.1 | 4.98 | 51.4 | 0.18 | 8.1 | 0.2 |
| 10% Aliquat 336 | 400.3 | 4.52 | 51.4 | 0.18 | 8.1 | 0.2 |
| 30% TOPO | 380.6 | <0.01 | 51.4 | 0.18 | 8.1 | 0.2 |

The inverse extraction tests were conducted by employing the two extracting agents: a primary amine (Primen JMT) and trioctylphosphine oxide (TOPO) which had extracted titanyl sulfate more effectively.

TABLE 3

Inverse Extraction Test

| Organic Solvent | Inverse Extracting Agent | Ti Concentration Before Extraction | Ti Concentration After Extraction | O/A |
|---|---|---|---|---|
| 20% Primen JMT + Kerosine | Water | 8.1 | 1.1 | 1/5 |
| 30% TOPO + Paraffin | Water | 9.98 | <0.1 | 1/5 |

(Unit: g/l)

Example 2

NaCl was added to the starting solution shown in Table 1, and was used for the starting solution in this example.

TABLE 4

Test for Extraction of Chloride Complex (Unit: g/l)

| | Total H$_2$SO$_4$ | Total HCl | Ti | Fe | Zn | Mn | Si |
|---|---|---|---|---|---|---|---|
| Starting Solution for Extraction | 220.2 | 8.2 | 2.74 | 28.2 | 0.1 | 4.4 | 1.2 |
| Organic Phase 30% TOPO (after extraction) | 1.1 | 12.1 | 5.48 | 2.04 | 0.2 | <0.01 | 2.5 |
| Organic Phase 20% Primen (after extraction) | 1.8 | 11.9 | 5.6 | 1.60 | 0.2 | <0.01 | 2.5 |

Example 3

The organic solvent used for the test contained 30% TOPO and titanyl sulfate which had been brought therein by preliminary extraction. The Ti concentration in the organic phase was 12.4 g/l. The inverse extracting agent used was water containing 0.5 g/l of C$_6$H$_8$O$_6$. O/A was 1/1, and shaking was conducted for 10 minutes.

The Ti concentration in the organic phase after the inverse extraction was not more than 0.1 g/l. The color of the aqueous solution turned reddish violet, which shows the existence of Ti$^{3+}$ ion therein.

Example 4

The starting solution shown in Table 1 was used in this example. The organic solvents used contained TOPO (trioctylphosphine oxide) or THPO (trihexylphosphine oxide) selected from the group of alkylphosphine oxides in an amount of 25%.

TABLE 5

Extraction of Titanyl Sulfate (Unit: g/l)

| | Total H$_2$SO$_4$ | Ti | Fe | Zn | Mn | Cr | Mg |
|---|---|---|---|---|---|---|---|
| 25% THPO (Organic Phase) | 15.4 | 3.78 | <0.01 | <0.01 | <0.01 | <0.01 | — |
| Raffinate (Aqueous Phase) | 385.7 | 1.21 | 51.4 | 0.18 | 8.1 | 0.05 | 4.2 |
| 25% TOPO (Organic Phase) | 16.8 | 4.11 | <0.01 | <0.01 | <0.01 | <0.01 | — |
| Raffinate (Aqueous Phase) | 384.3 | 0.88 | 51.4 | 0.18 | 8.1 | 0.05 | 4.2 |

The inverse extraction test was conducted with the organic solvents containing extracted TiO(SO$_4$)$_2$ shown in Table 5.

TABLE 6

Inverse Extraction of Titanyl Sulfate (Unit: g/l)

| Inverse Extracting Agent | O/A | Extracting Agent | Initial Ti | Ti after Equilibrium | Ti in Aqueous Phase |
|---|---|---|---|---|---|
| Water | 1/2 | TOPO | 4.11 | 1.39 | 1.36 |
| 20 g/l H$_2$SO$_4$ | 1/2 | TOPO | 4.11 | 0.47 | 1.82 |
| 40 g/l H$_2$SO$_4$ | 1/2 | TOPO | 4.11 | 0.19 | 1.96 |
| 100 g/l H$_2$SO$_4$ + C$_6$H$_8$O$_6$ | 4/1 | TOPO | 4.11 | 0.89 | 12.86 |
| Water | 1/2 | THPO | 3.78 | 0.52 | 1.63 |
| 20 g/l H$_2$SO$_4$ | 1/2 | THPO | 3.78 | 1.18 | 1.30 |
| 40 g/l H$_2$SO$_4$ | 1/2 | THPO | 3.78 | 0.12 | 3.66 |
| 100 g/l H$_2$SO$_4$ + C$_6$H$_8$O$_6$ | 4/1 | THPO | 3.78 | 0.56 | 12.88 |

Example 5

A continuous extraction test was conducted by use of en organic solvent containing 25% TOPO, and the starting solution shown in Table 1. The extraction conditions were: O/A=1/1, and 4-stage extraction.

TABLE 7

Continuous Extraction Test (Unit: g/l)

| Phase | Total H$_2$SO$_4$ | Ti | Fe | Mn | Cr | Zn |
|---|---|---|---|---|---|---|
| Organic Phase (Outlet) | 18.4 | 4.98 | <0.01 | <0.01 | <0.01 | <0.01 |
| Aqueous Phase (Outlet) | 382.7 | <0.01 | 51.4 | 8.1 | 0.05 | 0.18 |

Continuous inverse extraction tests were conducted with the organic solvents containing the extracted titanyl sulfate shown in Table 7. The conditions were: 6-stage inverse extraction, at room temperature. The results are shown in Table 8.

TABLE 8

Continuous Inverse Extraction Tests (Unit: g/l)

| | | Total $H_2SO_4$ | Ti | Fe | Mn | Zn |
|---|---|---|---|---|---|---|
| 25% THPO + Kerosine | Organic Phase (Outlet) | <0.01 | 0.11 | <0.01 | <0.01 | <0.01 |
| 5 g/l $H_2SO_4$ | Aqueous Phase (Outlet) | 45.1 | 9.96 | 0.15 | <0.01 | <0.01 |
| 25% TOPO + Paraffine | Organic Phase (Outlet) | <0.01 | 0.06 | <0.01 | <0.01 | <0.01 |
| 40 g/l $H_2SO_4$ + $C_6H_8O_6$ | Aqueous Phase (Outlet) | 130.7 | 19.9 | 0.2 | <0.01 | <0.01 |

Example 6

Organic solvents containing extracted titanyl sulfate were brought into contact with a reducing gas, and thereafter brought into contact with water or dilute sulfuric acid for inverse extraction of titanyl sulfate to the aqueous phase. The results are shown in Table 9. Two organic solvents were used. The organic solvent (A) is paraffine containing 30% TOPO and contains 4.11 g/l of extracted Ti: the organic solvent (B) is kerosine containing 25% THPO and contains 3.78 g/l of extracted Ti.

TABLE 9

Reductive Inverse Extraction (Unit: g/l)

| Extracting Agent | Reducing Agent | Pressure | O/A | Inverse Extracting Agent | Equilibrium Organic Phase | Equilibrium Aqueous Phase |
|---|---|---|---|---|---|---|
| TOPO | $H_2S$ Gas | 5 kg/cm² | 1/1 | 20 g/l $H_2SO_4$ | 0.02 | 4.09 |
| THPO | $H_2$ Gas | 4 kg/cm² | 1/1 | Water | 0.32 | 3.48 |

Example 7

Preparation of titanyl sulfate solution

Ilmenite was used as the starting material which has the chemical composition of $TiO_2$: 44.2%, FeO: 34.1%, $Fe^2O_3$: 12 7%, MnO: 0.3%, $Cr_2O_3$: 0.01%, $V_2O_5$: 0.15%, $P_2O_5$: 0.03%, $Al_2O_3$: 1.2%, CaO: 0.25%, MgO: 4.72%, and $SiO_2$: 3.1%. 2.7 kg of the ilmenite was pulverized to give a particle size such that 90% thereof pass through −325 mesh sieve. The pulverized material was mixed with 4.5 kg of 95.1% $H_2SO_4$, and preheated to a temperature of 80° C.

A small amount of water was added thereto to promote sulfation reaction. The temperature of the mixture rose to 210° C. After aging in that state for 5 hours, it was put into a liquid shown in Table 8 containing inversely extracted titanyl sulfate to dissolve the titanyl sulfate formed above. Since the reducing agent had been added to the liquid at the inverse extraction conducted before, the Fe ion was confirmed to exist all as ferrous sulfate.

Insoluble residue: 0.31 kg
Leaching liquid (titanyl sulfate solution): 5.31 liters
Composition of the leaching liquid: $TiO_2$:1984 g/l, Fe:180 g/l, $H_2SO_4$:804.1 g/l Subsequently the leaching solution was cooled to 10° C. to separate crystalline iron sulfate. The yield of the resulting $FeSO_4 \cdot 7H_2O$ was 3.6 kg.

The quantity and the composition of the liquid after the crystals were filtered off were as below:

| Liquid Quantity | Total $H_2SO_4$ | Fe | Ti |
|---|---|---|---|
| 4.01 liters | 649.2 g/l | 74.9 g/l | 266.4 g/l |

Hydrolysis test

The hydrolysis test was conducted with the liquid having the above composition.

Firstly, 0.5 liter of the liquid shown in Table 8 (containing 45.1 g/l of total $H_2SO_4$ and 9.96 g/l of Ti) which had been used for inverse extraction of titanyl sulfate was preheated to 95° C., and thereto 4.0 liters of the solution of the titanyl sulfate was continuously added.

To the resulting solution sufficiently adjusted to a certain concentration and maintained at a temperature of 95° to 98° C., 1.1 liters of a liquid having been completed an inverse extraction as shown in Table 8 heated to 95° C. was added. The liquid was heated to the boiling temperature. When formation of precipitate was observed, the heating and agitation were stopped and the liquid was subjected to aging.

After 30 minutes, agitation was restarted, and the liquid was heated again to the boiling temperature, being kept in that state for 3 hours. Thereto, 1.5 liters of the aqueous solution (containing 45.1 g/l of total $H_2SO_4$ and 9.96 g/l of Ti) having been used for the inverse extraction as shown in Table 8 was added. When the completion of the hydrolysis was confirmed, the agitation was stopped.

Calcination

The resultant insoluble titanium hydroxide was dehydrated, washed, and further washed with an acid. It was mixed with 0.5% by weight of $K_2SO_4$, 0.1% by weight of $Al_2(SO_4)_3$ and 0.1% by weight of $ZnSO_4$, and the mixture was calcined at 870° C. for 60 minutes.

The yield of $TiO_2$ was 1.06 kg. The recovery rate of $TiO_2$ from the dissolved titanyl sulfate solution was 100.9%, with the complete recovery of $TiO_2$ supplied from the inverse extraction liquid.

The amount and the composition of the liquid after filtration of titanium hydroxide were as below:

| Amount of Liquid | Total $H_2SO_4$ | $TiO_2$ | Fe |
|---|---|---|---|
| 6.51 liters | 399.4 g/l | 9.1 g/l | 49.8 g/l |

The value of 9.1 g/l for $TiO_2$ is normal for the remaining amount in the sulfuric acid solution after hydrolysis. This proves that all of the $TiO_2$ in the inverse extraction liquid employed for the hydrolysis converted to the product.

The experimental yield of 100.9% from the titanyl leaching solution to the titanium oxide clearly shows the effect of the extraction recovery in comparison with the conventional values of 94 to 95%.

Example 8

A test was made for selective removal of Fe ions and Zn ions, co-extracted with titanyl sulfate, from the organic phase by washing.

The organic solvent used in this experiment was the one containing 30% TOPO shown in Table 4, containing 5.48 g/l of Ti, 2.04 g/l of Fe, and 0.2 g/l of Zn. The washing solution used was the one containing 250 g/l or total $H_2SO_4$ and 44.1 g/l of Ti. The conditions of washing were: O/A of 15/1, 2-stage countercurrent contact, at a room temperature.

TABLE 10

Impurity Removal Test (Unit: g/l)

| | Total $H_2SO_4$ | Total HCl | Ti | Fe | Zn | Mn | Cr | Si |
|---|---|---|---|---|---|---|---|---|
| Organic Phase (Outlet) | 11.6 | 12.1 | 9.87 | <0.01 | <0.01 | <0.01 | <0.01 | 2.46 |
| Aqueous Phase (Outlet) | 198.2 | <0.1 | 22.15 | 30.6 | 3.01 | <0.01 | <0.01 | 0.32 |

What is claimed is:

1. A method for manufacturing titanium oxide, comprising:
   a. subjecting a sulfuric acid solution containing predominantly titanium ions and one or more metal ions to hydrolysis to form insoluble titanium hydroxide;
   b. separating the titanium hydroxide from the solution;
   c. contacting the separated solution with an organic solvent containing one or more species selected from the group consisting of oxygen-containing organic solvents, alkyl amines, and alkyl aryl amines to extract the titanium ions in a form of a sulfate titanyl into the organic solvent, and separating the organic solvent extract from the aqueous raffinate;
   d. contacting the organic solvent containing the extracted sulfate titanyl with water or a dilute sulfuric acid solution to inversely extract the titanium from the organic solvent into the water or the dilute sulfuric acid solution and to regenerate the organic solvent;
   e. recycling the solution containing the inversely extracted titanium to hydrolysis step a.; and
   f. calcining the separated titanium hydroxide from step b. to produce titanium oxide.

2. A method for manufacturing titanium oxide, comprising:
   a. subjecting a sulfuric acid solution containing predominantly titanium ions and one or more metal ions to hydrolysis to form insoluble titanium hydroxide;
   b. separating the titanium hydroxide from the solution;
   c. contacting the separated solution with an organic solvent containing one or more species selected from the group consisting of oxygen-containing organic solvents, alkyl amines, and alkyl aryl amines to extract the titanium ions in a form of a sulfate titanyl into the organic solvent, and separating the organic solvent extract from the aqueous raffinate;
   d. contacting the organic solvent containing the extracted sulfate titanyl with water or a dilute sulfuric acid solution to inversely extract the titanium from the organic solvent into the water or the dilute sulfuric acid solution and to regenerate the organic solvent;
   e. recycling the solution containing the inversely extracted titanium to hydrolysis step a.;
   f. calcining the separated titanium hydroxide to produce titanium oxide;
   g. adding to the raffinate resulting from the step c. at least one compound selected from the group consisting of the chlorides of Na, K, Mg, Ca, and $NH_4$ in an amount equivalent chemically to the sum of free $SO_4$ ions and iron-bonded $SO_4$ ions in the raffinate;
   h. contacting the raffinate with a second organic solvent containing one or more species selected from the group consisting of oxygen-containing organic solvents, alkyl amines and alkyl aryl amines to extract iron ions as a chloride complex from the raffinate into the second organic solvent; and
   i. contacting the second organic solvent containing iron ions and chloride ions with water to inversely extract the iron ions and the chloride ions from the second organic solvent into the water and regenerate the second organic solvent.

3. A method for manufacturing titanium oxide, comprising:
   a. subjecting a sulfuric acid solution containing predominantly titanium ions and one or more metal ions to hydrolysis to form insoluble titanium hydroxide;
   b. separating the titanium hydroxide from the solution;
   c. contacting the separated solution with an organic solvent containing one or more species selected from the group consisting of oxygen-containing organic solvents, alkyl amines, and alkyl aryl amines to extract the titanium ions in a form of a sulfate titanyl into the organic solvent, and separating the organic solvent extract from the aqueous raffinate;
   d. contacting the organic solvent containing the extracted sulfate titanyl with water or a dilute sulfuric acid solution to inversely extract the titanium from the organic solvent into the water or the dilute sulfuric acid solution and to regenerate the organic solvent;
   e. recycling the solution containing the inversely extracted titanium to hydrolysis step a.;

f. calcining the separated titanium hydroxide from step b. to produce titanium oxide; and g. concentrating the raffinate from step c. at a pressure no greater than atmospheric to recover concentrated sulfuric acid and decrease the quantity of sulfate titanyl formed.

4. The method of claims 1, 2, or 3 wherein the organic solvent containing the extracted sulfate titanyl is contacted with a reducing agent.

5. The method of claims 1, 2 or 3 wherein a reducing agent is added to the water or dilute sulfuric acid of step d. prior to contact with the solvent.

6. The method of claims 1, 2 or 3 wherein the solution from step d. is introduced to an evaporation-concentration step operated under a pressure no greater than atmospheric pressure to hydrolyze the sulfate titanyl prior to step e.

7. A method for manufacturing titanium oxide comprising:

a. adding to a sulfuric acid solution containing predominantly titanium ions and additionally one or more of iron and other metal ions, at least one species selected from the group consisting of the chlorides of H, Na, Mg, K, Ca, and $NH_4$ in an amount required to form the chloride complex of the titanium ion in the sulfuric acid solution:

b. contacting the sulfuric acid solution with an organic solvent containing at least one species selected from the group consisting of oxygen-containing organic solvents, alkyl amines, and alkyl aryl amines to extract the titanium from the sulfuric acid solution in the form of a chloride complex;

c. contacting the organic solvent containing the titanium ions and chloride ions with water to inversely extract the titanium ions and chloride ions from the organic solvent into the water and to regenerate the organic solvent and separating the water from the organic solvent;

d. neutralizing the separated water from step c. to precipitate titanium hydroxide and separating the titanium hydroxide; and e. calcining the separated titanium hydroxide from step b. to produce titanium oxide.

8. The method of claim 7 wherein the organic solvent containing a chloride complex is contacted with an aqueous solution containing at least one compound selected from the group consisting of compounds of Na and Cl; Na and $SO_4$; Ti and Cl; and Ti and $SO_4$ to selectively eliminate impurities coextracted with the chloride complex of the titanium.

9. The method of claims 1, 2, 3, or 7, wherein the organic solvent or sulfate complex of titanium is contacted with an aqueous solution containing at least one compound selected from the group consisting of compounds of Na and Cl; Na and $So_4$; Ti and Cl; and Ti and $So_4$ to selectively eliminate impurities co-extracted with the chloride complex or the sulfate complex of the titanium.

* * * * *